(12) United States Patent
Xu et al.

(10) Patent No.: US 8,588,140 B2
(45) Date of Patent: Nov. 19, 2013

(54) USER INFORMATION NOTIFYING METHOD, SYSTEM AND APPARATUS

(75) Inventors: Hui Xu, Beijing (CN); Juan Zhang, Beijing (CN); Ming Ai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 486 days.

(21) Appl. No.: 12/990,877

(22) PCT Filed: May 4, 2009

(86) PCT No.: PCT/CN2009/071625
§ 371 (c)(1),
(2), (4) Date: Nov. 3, 2010

(87) PCT Pub. No.: WO2009/135431
PCT Pub. Date: Nov. 12, 2009

(65) Prior Publication Data
US 2011/0058521 A1   Mar. 10, 2011

(30) Foreign Application Priority Data
May 4, 2008   (CN) .......................... 2008 1 0105858

(51) Int. Cl.
*H04W 28/00*   (2009.01)
(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 7,848,269 B2 * | 12/2010 | Tamura et al. ............. | 370/310.2 |
| 8,165,068 B2 * | 4/2012 | Zhao et al. .................... | 370/328 |
| 2010/0080186 A1 * | 4/2010 | Guo et al. ...................... | 370/329 |
| 2010/0189035 A1 * | 7/2010 | Pehrsson et al. ............. | 370/328 |
| 2011/0110300 A1 * | 5/2011 | Sachs et al. ................... | 370/328 |

FOREIGN PATENT DOCUMENTS

| | | | |
|---|---|---|---|
| CN | 1992962 A | | 7/2007 |
| CN | 101170831 A | | 4/2008 |
| WO | WO 2008/088258 | * | 7/2008 |
| WO | 2009/054702 A1 | | 4/2009 |

OTHER PUBLICATIONS

International Search Report: PCT/CN2009/071625.

* cited by examiner

*Primary Examiner* — Min Jung
(74) *Attorney, Agent, or Firm* — Ladas & Parry LLP

(57) ABSTRACT

The present invention discloses a user information notifying method, system and apparatus. In the present invention, a MME obtains RAT/Frequency Selection Priority information of UE, and notifies an eNodeB of the information. According to the method, system and apparatus of the present invention, the eNodeB can obtain the RAT/Frequency Selection Priority information of the UE, and further perform Radio Resource Management according to the information, thereby improving system performance.

6 Claims, 3 Drawing Sheets

--Prior Art--

US 8,588,140 B2

USER INFORMATION NOTIFYING METHOD, SYSTEM AND APPARATUS

FIELD OF THE INVENTION

The present invention relates to mobile communication technologies, and more particularly to a user information notifying method, system and apparatus in a mobile communication system.

BACKGROUND OF THE INVENTION

In a conventional 3rd-Generation Partnership Project (3GPP) system, a Radio Network Controller (RNC)/Base Station Controller (BSC) may perform Radio Resource Management (RRM) by analyzing a stored International Mobile Subscriber Identity (IMSI) of User Equipment (UE) to determine which frequency layer is preferentially used for the UE, so as to implement a radio access procedure. For example, in an IMSI Based Handover, the RNC/BSC may obtain subscription information of the UE by analyzing the IMSI of the UE, and allocate resources or parameters used for radio access to the UE according to the subscription information of the UE, so as to implement the radio access procedure.

A conventional System Architecture Evolution (SAE) system or Long Term Evolution (LTE) system also support an RRM strategy based on the subscription information of the UE. For example, in an Evolution-Universal Mobile Telecommunication System Terrestrial Access Network (E-UTRNA), an evolved base station (eNodeB) may determine the priority of cell reselection of the UE according to Radio Access Technology (RAT)/Frequency Selection Priority (RFSP) information contained in the subscription information of UE, and determine different frequency stratums or different RATs used for the UE in a re-direction connection mode.

However, for security, the eNodeB does not store the IMSI of the UE, and thus is unable to obtain the RAT/Frequency Selection Priority information of the UE by analyzing the IMSI of the UE. Hence, the eNodeB can not obtain the RAT/Frequency Selection Priority information of the UE unless another entity, e.g. a Mobile Management Entity (MME), notifies the eNodeB.

In the prior art, in an initial attach procedure, a Home Subscriber Server (HSS) provides the RAT/Frequency Selection Priority information of the UE to the MME; after receiving the information, if it is determined that the UE is in a non-roaming state, the MME directly stores the information; if it is determined that the UE is in a roaming state, the MME firstly modifies the information according to a strategy of a visit network in which the UE is located currently, and then stores the information. FIG. 1 is a schematic diagram illustrating a conventional initial attach procedure. As shown in FIG. 1, in Step 10, the HSS sends the MME an Insert Subscriber Data message containing the RAT/Frequency Selection Priority information of the UE.

According to the mode shown in FIG. 1, the MME is able to obtain the RAT/Frequency Selection Priority information of the UE. But it is can be seen according to the above description, it is the eNodeB that really needs the information. However, it is not described in the prior art how the MME notifies the eNodeB of the obtained RAT/Frequency Selection Priority information of the UE.

Meanwhile, after an operator modifies the subscription information of UE stored in the HSS, the HSS also sends the MME the Insert Subscriber Data message to notify the MME that the RAT/Frequency Selection Priority information of the UE has been modified, but the MME also merely stores the information, rather than triggers other procedures. That is to say, it is also not described in the prior art how the MME notifies the eNodeB of the modified RAT/Frequency Selection Priority information of the UE.

It is can be seen that, in the prior art, the eNodeB can not obtain the needed RAT/Frequency Selection Priority information of the UE because it can not receive the notification from the MME, and thus can not perform Radio Resource Management (RRM) according to the information, thereby influencing system performance.

SUMMARY OF THE INVENTION

Embodiments of the present invention provide a user information notifying method, by which an eNodeB can obtain RAT/Frequency Selection Priority information of UE.

The embodiments of the present invention also provide a user information notifying system, by which an eNodeB can obtain RAT/Frequency Selection Priority information of UE.

The embodiments of the present invention also provide a user information notifying apparatus, by which an eNodeB can obtain RAT/Frequency Selection Priority information of UE.

The technical solution of the present invention is implemented as follows.

A user information notifying method includes:
notifying, by a Mobile Management Entity (MME), an evolved base station (eNodeB) of obtained Radio Access Technology (RAT)/Frequency Selection Priority information of User Equipment (UE).

A user information notifying system includes: a Mobile Management Entity (MME) and an evolved base station (eNodeB);
the MME is adapted to notify the eNodeB of obtained Radio Access Technology (RAT)/Frequency Selection Priority information of User Equipment (UE); and
the eNodeB is adapted to receive the RAT/Frequency Selection Priority information of the UE from the MME.

A user information notifying apparatus includes: an obtaining unit and a notifying unit;
the obtaining unit is adapted to obtain Radio Access Technology (RAT)/Frequency Selection Priority information of User Equipment (UE); and
the notifying unit is adapted to notify an evolved base station (eNodeB) of the obtained RAT/Frequency Selection Priority information of the UE.

As can be seen from the technical solution of the present invention, the eNodeB can obtain the RAT/Frequency Selection Priority information of the UE by receiving the notification from the MME, and further perform Radio Resource Management according to the information, thereby improving system performance.

BRIEF DESCRIPTION OF THE DRAWINGS

The embodiments of the present invention will be illustrated in detail hereinafter with reference to the accompanying drawings, so as to make the above and other characteristics and merits of the present invention clearer for those skilled in the art.

DETAILED DESCRIPTION OF THE INVENTION

In order to make the object, technical solutions and merits of the present invention clearer, the present invention will be illustrated in detail hereinafter with reference to the accompanying drawings and specific embodiments.

The present invention provides a new user information notifying method to solve the problem in the prior art. In the method, a MME notifies an eNodeB of obtained RAT/Frequency Selection Priority information of UE. Specifically, when the UE performs an initial attach procedure or a Track Area Update (TAU) procedure, or switches from an Idle state to an Active state, the MME notifies the eNodeB of the obtained RAT/Frequency Selection Priority information of the UE through an Initial Context Setup Request message; when the UE is in the Active state, the MME notifies the eNodeB of the obtained RAT/Frequency Selection Priority information of the UE through a UE Context Modification Request message.

The technical solution of the present invention is described in detail hereinafter according to the specific embodiments.

Figure 1:
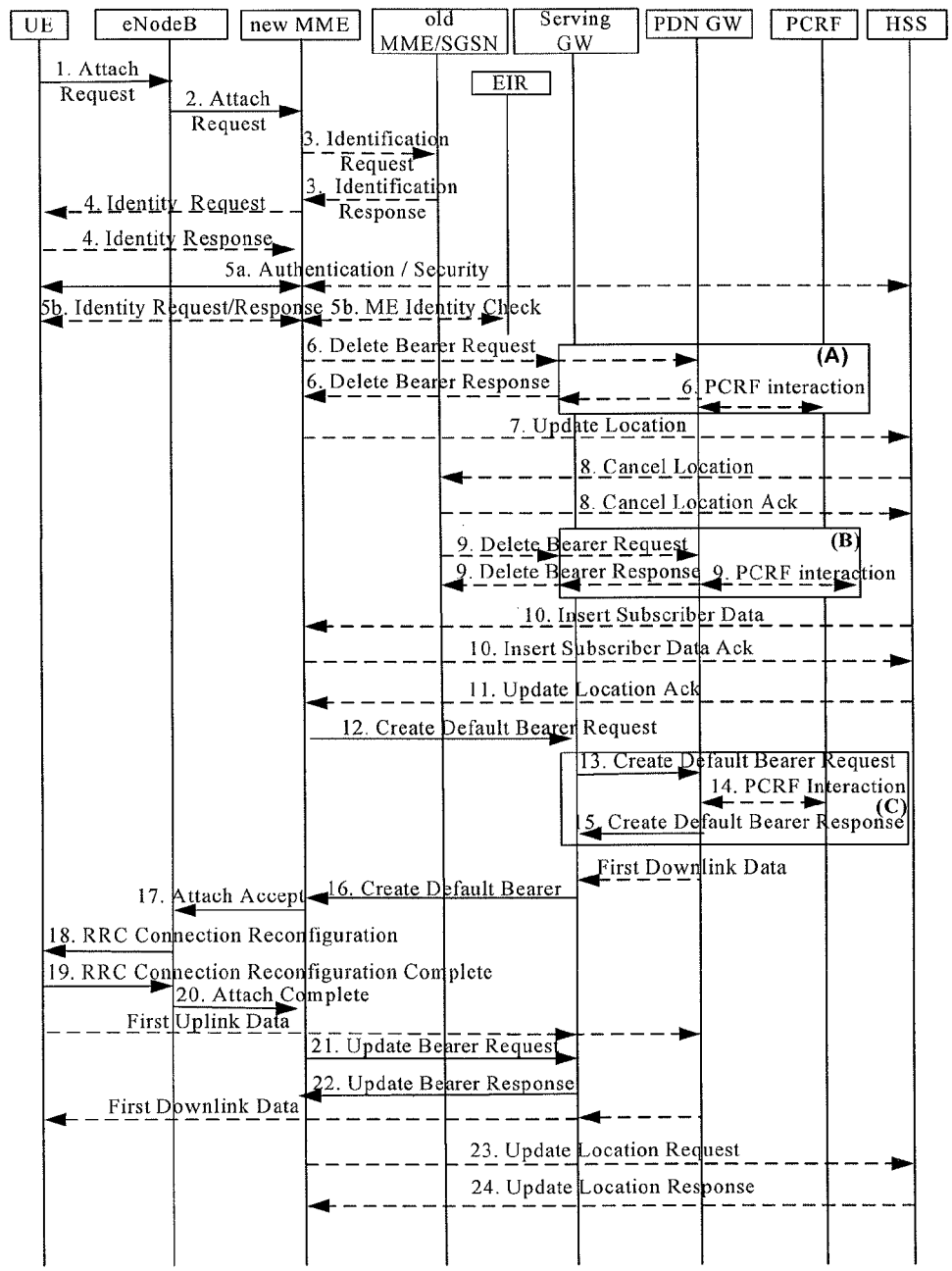
FIG. 1 is a schematic diagram illustrating a conventional initial attach procedure.
Figure 2:
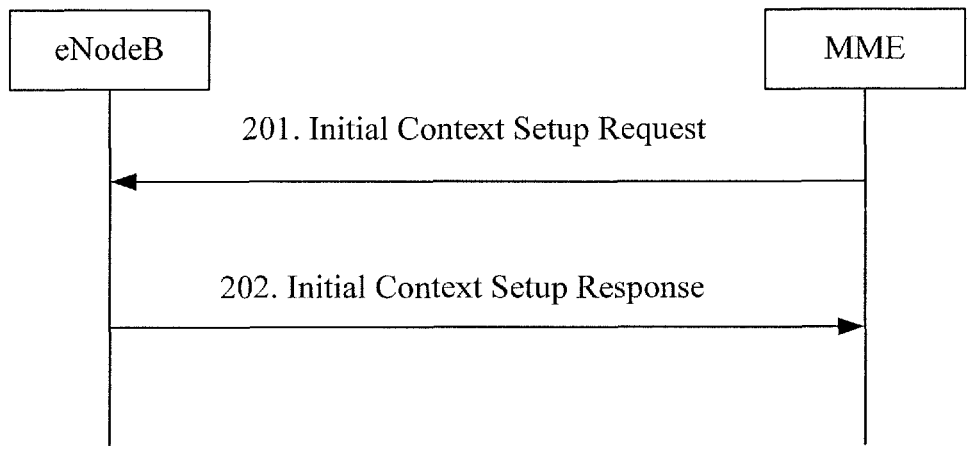
FIG. 2 is a flowchart illustrating a user information notifying method according to an embodiment of the present invention.

FIG. 2 is a flowchart illustrating a user information notifying method according to an embodiment of the present invention. As shown in FIG. 2, the user information notifying method includes the following steps.

Step 201: a MME sends an Initial Context Setup Request message to an eNodeB.

When UE performs an initial attach procedure or a TAU procedure, the MME performs information interaction with an HSS, and obtains RAT/Frequency Selection Priority information of the UE which is contained in an Insert Subscriber Data message received from the HSS. Afterwards, according to the method provided by the embodiment of the present invention, the MME sends the eNodeB the Initial Context Setup Request message containing the RAT/Frequency Selection Priority information of the UE, so as to notify the eNodeB of the RAT/Frequency Selection Priority information of the UE.

In addition, when the UE is in an Idle state and initiates a Service Request procedure to switch from the Idle state to an Active state, the MME may notify the eNodeB of the RAT/Frequency Selection Priority information of the UE obtained in advance from the HSS, i.e. send the eNodeB the Initial Context Setup Request message containing a RAT/Frequency Selection Priority parameter.

Herein, the obtaining the RAT/Frequency Selection Priority information of the UE in advance by the MME may include that after an operator modifies subscription information of the UE stored in the HSS, the HSS initiates an Insert Subscriber Data procedure to notify the MME of the modified RAT/Frequency Selection Priority information of the UE. After the MME obtains the information, if it is determined that the UE is in the Idle state, the MME does not notify the eNodeB of the information; if it is determined that the UE initiates a Service Request procedure and switches from the Idle state to the Active state, the MME notifies the eNodeB of the information through the Initial Context Setup Request message according to the embodiment of the present invention; if it is determined that the UE is in the Active state, processing is performed according to a method shown in FIG. 3.

Step 202: the eNodeB sends an Initial Context Setup Response message to the MME.

The eNodeB stores the received RAT/Frequency Selection Priority information of the UE, and sends the Initial Context Setup Response message to the MME.

It should be noted that, the Initial Context Setup Request message and the Initial Context Setup Response message are all conventional messages, the difference between the embodiment of the present invention and the prior art merely lies in that the Initial Context Setup Request message further contains a RAT/Frequency Selection Priority parameter.

As shown in following tables, Table 1 shows the structure of the Initial Context Setup Request message in a conventional protocol, and Table 2 shows the structure of the Initial Context Setup Response message in the conventional protocol. As can be seen from Table 1, in the structure of the conventional Initial Context Setup Request message, contents related to the RAT/Frequency Selection Priority information of the UE are not defined. In the embodiment of the present invention, the structure of the conventional Initial Context Setup Request message shown in Table 1 may be extended, in the column corresponding to the Information Element (IE)/Group Name, and following the item of the UE Radio Capability parameter shown in Table 1, a RAT/Frequency Selection Priority parameter for carrying the RAT/Frequency Selection Priority information of the UE may be added.

TABLE 1 the structure of the Initial Context Setup Request message

| IE/Group Name | Presence | Range |
|---|---|---|
| Message Type | Must selected (M) | |
| MME UE S1 Access Point Identity (MME UE S1AP ID) | M | |
| eNodeB (eNB) UE S1AP ID | M | |
| Aggregate Maximum Bit Rate | Optional (O) | |
| System Architecture Evolution (SAE) Bearer to Be Setup List | M | |
| > SAE Bearer to Be Setup Item IEs | | 1 to <maxnoofSAEbearers> |
| >>SAE Bearer ID | M | |
| >>SAE Bearer Level QoS Parameters | M | |
| >>Transport Layer Address | M | |
| >> GPRS Tunnelling Protocol Tunnel Endpoint ID (GTP TEID) | M | |
| Security | M | |
| Track Activation | O | |
| Serving PLMN | O | |
| Handover Restriction List | O | |
| Non-Access Stratum-Packet Data Unit (NAS-PDU) | O | |
| UE Radio Capability | O | |

TABLE 2 the structure of the Initial Context Setup Response message

| IE/Group Name | Presence | Range |
|---|---|---|
| Message Type | M | |
| MME UE S1AP ID | M | |
| eNB UE S1AP ID | M | |

TABLE 2-continued the structure of the Initial Context Setup Response message

| IE/Group Name | Presence | Range |
|---|---|---|
| SAE Bearer Setup List | O | |
| > SAE Bearer Setup Item IEs | | 1 to <maxnoofSAEbearers> |
| >>SAE Bearer Identity | M | |
| >>Transport Layer Address | M | |
| >>GTP TEID | M | |
| SAE Bearer Failed to Setup List | O | |
| > SAE Bearer Failed to Setup Item IEs | | 1 to <maxnoofSAEbearers> |
| >>SAE Bearer ID | M | |
| >> Cause | M | |

Figure 3:
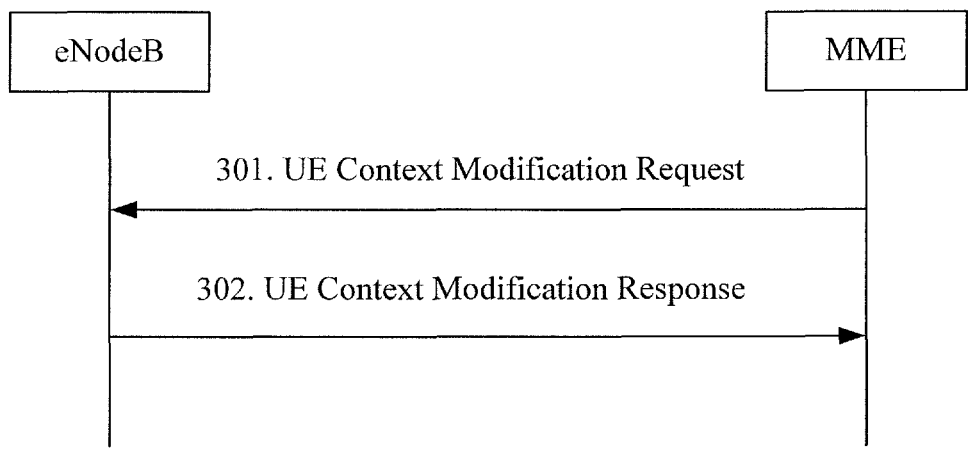
FIG. 3 is a flowchart illustrating a user information notifying method according to another embodiment of the present invention.

FIG. 3 is a flowchart illustrating a user information notifying method according to another embodiment of the present invention. As shown in FIG. 3, the user information notifying method includes the following steps.

Step 301: a MME sends UE Context Modification Request message to an eNodeB.

After an operator modifies subscription information of the UE stored in an HSS, the HSS initiates an Insert Subscriber Data procedure to notify the MME of modified RAT/Frequency Selection Priority information of the UE. According to the embodiment of the present invention, when it is determined that the UE is in an Active state, the MME may notify the eNodeB of the information through a UE Context Modification procedure, i.e. sends the eNodeB a UE Context Modification Request message containing a RAT/Frequency Selection Priority parameter.

Step 302: the eNodeB sends a UE Context Modification Response message to the MME.

The eNodeB stores the received RAT/Frequency Selection Priority information of the UE, and sends the UE Context Modification Response message to the MME.

Similarly, the UE Context Modification Request message and the UE Context Modification Response message are all conventional messages, the difference between the embodiment of the present invention and the prior art merely lies in that the UE Context Modification Request message further contains a RAT/Frequency Selection Priority parameter.

As shown in following tables, Table 3 shows the structure of the UE Context Modification Request message in a conventional protocol, and Table 4 shows the structure of the UE Context Modification Response message in the conventional protocol. As can be seen from Table 3, in the structure of the conventional UE Context Modification Request message, contents related to the RAT/Frequency Selection Priority information of the UE are not defined. In the embodiment of the present invention, the structure of the conventional Initial Context Setup Request message shown in Table 3 may be extended, in the column corresponding to the IE/Group Name, and following the item of the Security Information parameter shown in Table 3, a RAT/Frequency Selection Priority parameter for carrying the RAT/Frequency Selection Priority information of the UE may be added.

TABLE 3 the structure of the UE Context Modification Request message

| IE/Group Name | Presence | Range |
|---|---|---|
| Message Type | M | |
| MME UE S1AP ID | M | |
| eNB UE S1AP ID | M | |
| Security Information | O | |

TABLE 4 the structure of the UE Context Modification Response message

| IE/Group Name | Presence | Range |
|---|---|---|
| Message Type | M | |
| MME UE S1AP ID | M | |
| eNB UE S1AP ID | M | |

By using the method provided by the above embodiment, the eNodeB in the present invention can obtain the RAT/Frequency Selection Priority information of the UE in any case.

Figure 4:
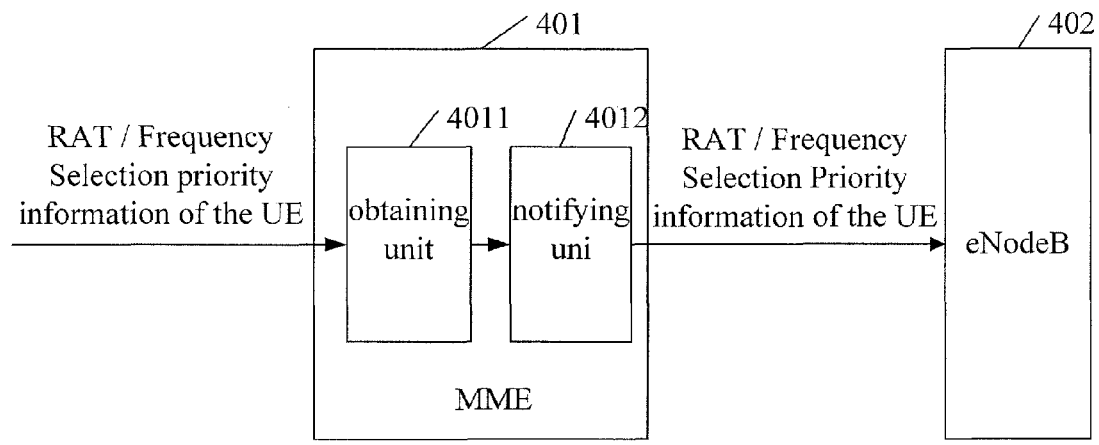
FIG. 4 is a schematic diagram illustrating the structure of a user information notifying system according to an embodiment of the present invention.

FIG. 4 is a schematic diagram illustrating the structure of a user information notifying system according to an embodiment of the present invention. As shown in FIG. 4, the user information notifying system includes a MME 401 and an eNodeB 402.

The MME 401 is adapted to notify the eNodeB 402 of obtained RAT/Frequency Selection Priority information of UE.

The eNodeB 402 is adapted to receive the RAT/Frequency Selection Priority information of the UE from the MME 401.

The MME 401 includes an obtaining unit 4011 and a notifying unit 4012.

The obtaining unit 4011 is adapted to obtain the RAT/Frequency Selection Priority information of the UE, and the notifying unit 4012 is adapted to notify the eNodeB 402 of the obtained RAT/Frequency Selection Priority information of the UE. When the UE performs an initial attach procedure or a TAU procedure, or switches from an Idle state to an Active state, the notifying unit 4012 notifies the eNodeB of the RAT/Frequency Selection Priority information of the UE through an Initial Context Setup Request message. When the UE is in the Active state, the notifying unit 4012 notifies the eNodeB of the RAT/Frequency Selection Priority information of the UE through a UE Context Modification Request message.

Figure 5:
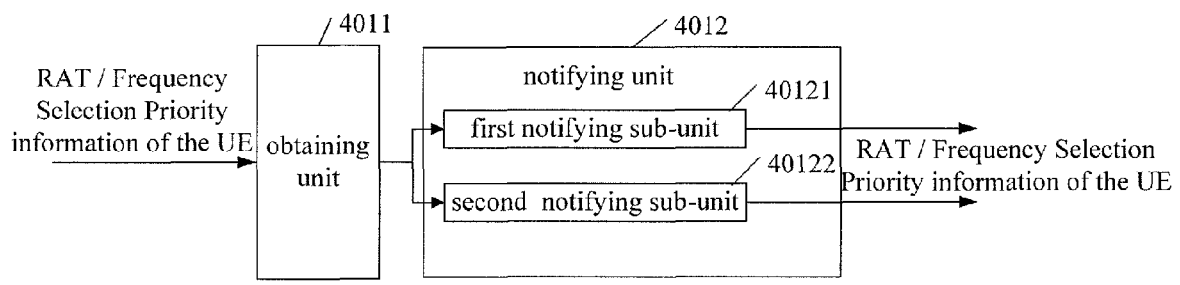
FIG. 5 is a schematic diagram illustrating the structure of a user information notifying apparatus according to an embodiment of the present invention.

FIG. 5 is a schematic diagram illustrating the structure of a user information notifying apparatus according to an embodiment of the present invention. As shown in FIG. 5, the user information notifying apparatus includes an obtaining unit 4011 and a notifying unit 4012.

The obtaining unit 4011 is adapted to obtain RAT/Frequency Selection Priority information of UE.

The notifying unit 4012 is adapted to notify an eNodeB 402 of the obtained RAT/Frequency Selection Priority information of the UE.

The notifying unit 4012 includes a first notifying sub-unit 40121 and a second notifying sub-unit 40122.

The first notifying sub-unit 40121 is adapted to notify the eNodeB 402 of the RAT/Frequency Selection Priority information of the UE through an Initial Context Setup Request message when the UE performs an initial attach procedure or a TAU procedure, or switches from an Idle state to an Active state.

The second notifying sub-unit 40122 is adapted to notify the eNodeB of the RAT/Frequency Selection Priority information of the UE through a UE Context Modification Request message when the UE is in the Active state.

Detailed work procedures of the system and apparatus shown in FIGS. 4 and 5 may refer to descriptions corresponding to the method embodiments, and will not be described in detail herein.

To sum up, according to the technical solution of the present invention, the eNodeB can obtain the RAT/Frequency Selection Priority information of the UE by receiving the notification from the MME, and further perform Radio Resource Management according to the information, thereby improving system performance.

The foregoing is only preferred embodiments of the present invention and is not for use in limiting the invention. Any modification, equivalent substitution, and improvement within the spirit and principle of the invention should be covered in the protection scope of the invention.

The invention claimed is:

1. A user information notifying method, comprising:
    notifying, by a Mobile Management Entity (MME), an evolved base station (eNodeB) of obtained Frequency Selection Priority information of Radio Access Technology (RAT) of User Equipment (UE) through an Initial Context Setup Request message when the UE performs an initial attach procedure or a Track Area Update (TAU) procedure, or switches from an Idle state to an Active state; and
    notifying, by the MME, the eNodeB of the obtained Frequency Selection Priority information of RAT of the UE through a UE Context Modification Request message when the UE is in the Active state.

2. The method of claim 1, wherein the Frequency Selection Priority information of RAT obtained by the MME is received from a Home Subscriber Server (HSS).

3. The method of claim 1, wherein notifying, by the MME, the eNodeB of the obtained Frequency Selection Priority information of RAT of the UE through the Initial Context Setup Request message comprises:
    sending, by the MME, the eNodeB the Initial Context Setup Request message carrying a Frequency Selection Priority parameter of RAT; and
    notifying, by the MME, the eNodeB of the obtained Frequency Selection Priority information of RAT of the UE through the UE Context Modification Request message comprises:
    sending, by the MME, the eNodeB the UE Context Modification Request message carrying a Frequency Selection Priority parameter of RAT.

4. The method of claim 1, further comprising:
    storing, by the eNodeB, the received Frequency Selection Priority information of RAT of the UE.

5. A user information notifying system, comprising: a Mobile Management Entity (MME) and an evolved base station (eNodeB); wherein
    the MME is adapted to notify the eNodeB of obtained Frequency Selection Priority information of Radio Access Technology (RAT) of User Equipment (UE) through an Initial Context Setup Request message when the UE performs an initial attach procedure or a Track Area Update (TAU) procedure, or switches from an Idle state to an Active state; and notify the eNodeB of the Frequency Selection Priority information of RAT of the UE through a UE Context Modification Request message when the UE is in the Active state; and
    the eNodeB is adapted to receive the Frequency Selection Priority information of RAT of the UE from the MME.

6. An user information notifying apparatus, comprising: an obtaining unit and a notifying unit;
    the obtaining unit is adapted to obtain Frequency Selection Priority information of Radio Access Technology (RAT) of User Equipment (UE); and
    the notifying unit is adapted to notify an evolved base station (eNodeB) of the obtained Frequency Selection Priority information of RAT of the UE through an Initial Context Setup Request message when the UE performs an initial attach procedure or a Track Area Update (TAU) procedure, or switches from an Idle state to an Active state;
    and notify the eNodeB of the Frequency Selection Priority information of RAT of the UE through a UE Context Modification Request message when the UE is in the Active state.

* * * * *